Feb. 4, 1936.   C. A. JOHNSTON   2,029,660
DISPENSING CONTAINER
Filed Jan. 24, 1935
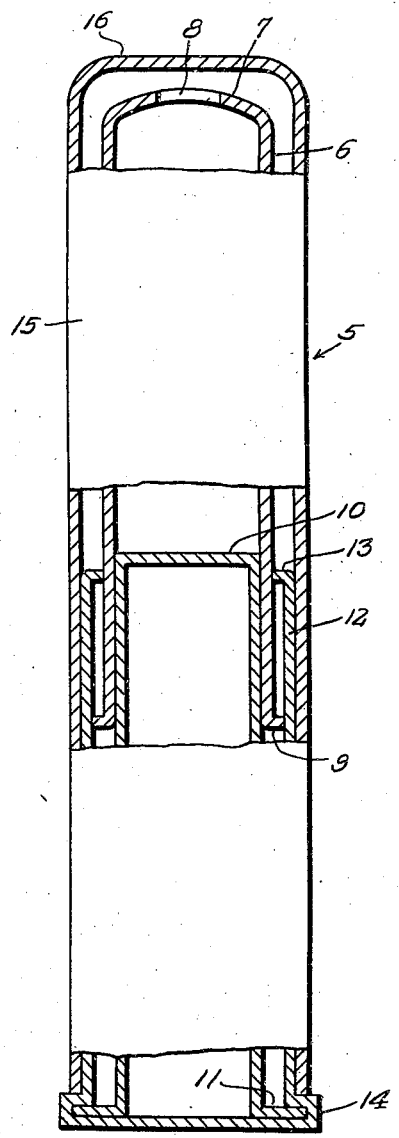
Fig. 1.
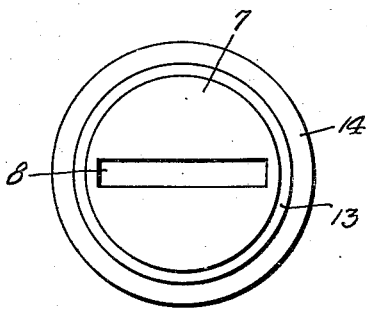
Fig. 3.
Fig. 2.
Inventor
Clarence A. Johnston
By Clarence A. O'Brien
Attorney Patented Feb. 4, 1936

2,029,660

UNITED STATES PATENT OFFICE 2,029,660

DISPENSING CONTAINER

Clarence A. Johnston, Pecos, N. Mex.

Application January 24, 1935, Serial No. 3,325

1 Claim. (Cl. 206—56)

My invention relates generally to dispensing containers, and particularly to a device for containing and automatically dispensing lipstick, and other cosmetics and ointments, and the like, and an important object of my invention is to provide a device of this kind which automatically dispenses its contents in a controlled manner upon application of the device of the invention to the place to which the lipstick, etc., or the like is to be applied, and in a manner to make unnecessary the spreading of the lipstick or the like with the fingers to achieve a proper distribution thereof.

Another important object of my invention is to provide a simplified and relatively inexpensive device of the character indicated above which is comparatively small in size and is durable and practical.

Other objects and advantages of my invention will be apparent from a reading of the following description in connection with the drawing, wherein for purposes of illustration I have shown a preferred embodiment of my invention.

In the drawing:—

Figure 1 is a sectional elevational view through an embodiment of the invention.

Figure 2 is a top plan view of Figure 1 with the outer cap removed.

Figure 3 is a view similar to Figure 2 showing the top of the container provided with a circular hole particularly adapted for dispensing ointments and the like in stick form, while the transverse slot of Figure 2 is especially adapted for dispensing and spreading lipstick.

Referring in detail to the drawing, the numeral 5 generally designates the embodiment which comprises the slide barrel or container 6 having in its rounded top 7 the transverse slot 8 or the round hole 8a and having on its lower end the radially outwardly directed flange 9, the container 6 being slidably telescoped on the plunger 10 which has a closed top and has at its lower end the radially outwardly directed flange 11. The container 6 is sufficiently easily slidable on the plunger 10 so that when the top of the container 6 is applied, for instance, with slight pressure to the lips, the container will be caused to move downwardly on the plunger 10 and thereby force upwardly and out of the opening 8 or 8a the desired quantity of lipstick or ointment or the like.

A casing 12 having an inturned flange 13 at its top surrounds both the container 6 and the plunger 10, the casing and the plunger 10 being sufficiently concentrically spaced to permit the lower part of the container 6 to work therebetween, so that the inner edge of the flange 13 bears slidably against the radially outward side of the container 6 and the radially outward edge of the flange 9 bears slidably against the radially inward side of the casing 12 as shown in Figure 1.

The flange 11 on the lower end of the plunger 10 seats in an annular channel 14 which is produced by crimping the lower end of the casing 12, so that the plunger 10 is positively connected to the casing 12.

Slidably telescoped on the outer side of the casing 12 is the removable cap 15 which with its lower end abutting the top of the channel 14 as shown in Figure 1, has its top 16 spaced slightly above and out of contact with the top 7 of the container 6.

The device of the invention is used simply by removing the cap 15 then applying the top 7 of the container to the place to which the lipstick or ointment or the like is to be applied, and while holding the casing 12 exerting slight but sufficient pressure to cause the container 6 to slide down upon the plunger 10, and thereby cause the plunger 10 to push sufficient of the contents of the container 6 out through the opening 8 or 8a. The shape of the slot 8 is such as to cause the application of a quantity of lipstick or the like having a small cross section of relatively great width which may be smoothly and easily applied by moving the device back and forth across the place of application; so that it is then not necessary to achieve proper application, to resort to spreading the lipstick or the like with the fingers. The rounded top 7 of the container presents a smooth and unchafing contact to the skin and in conjunction with the opening 8 and 8a acts as a spreader or applicator completely under the control of the user for dispensing exactly the quantity wanted in a predetermined place and over a selected area.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claim.

What is claimed is:—

A device of the class described, comprising an elongated tubular casing having its lower end provided with an annular outwardly extending projection forming an internal annular groove and an external shoulder, a plunger having an outwardly extending flange at its bottom extending into the groove with its upper end projecting from the upper end of the casing, said upper end of the casing having an inwardly extending flange, the inner edge of which is spaced from the upper part of the plunger, a tubular container encircling the plunger and passing through the space between the flange at the upper end of the casing and the plunger, said container having an outwardly extending flange at its lower end contacting the internal wall of the casing, the upper end of the container being rounded and having an opening therein and a cap for fitting over the container and the casing and having its lower end engaging the shoulder of the casing.

CLARENCE A. JOHNSTON.